United States Patent

Gold

[11] Patent Number: 4,462,688
[45] Date of Patent: Jul. 31, 1984

[54] SPECTRALLY TAILORED WAFER CHUCK SHAPED LIGHT METER

[76] Inventor: Nathan Gold, 13126 Anza Dr., Saratoga, Calif. 95070

[21] Appl. No.: 321,657

[22] Filed: Nov. 16, 1981

[51] Int. Cl.³ .............................................. G01J 3/18
[52] U.S. Cl. .................................... 356/328; 356/334
[58] Field of Search ........ 356/308, 326, 328, 330–334; 350/266

[56] References Cited

U.S. PATENT DOCUMENTS

| | | | |
|---|---|---|---|
| 2,823,577 | 2/1958 | Machler | 356/326 |
| 3,549,261 | 12/1970 | Hach | 350/266 |
| 4,193,691 | 3/1980 | Fjarlie | 356/330 |
| 4,253,765 | 3/1981 | Kato et al. | 356/308 X |

FOREIGN PATENT DOCUMENTS

| | | | |
|---|---|---|---|
| 2027450 | 12/1971 | Fed. Rep. of Germany | 356/328 |
| 140580 | 10/1979 | Japan | 356/328 |

Primary Examiner—F. L. Evans

[57] ABSTRACT

An Ebert monochromator is modified in a wafer chuck format and adapted to received and sum spectrally tailored light in discrete band widths so that the meter emulates the photographic response of photo resist to light from a high pressure mercury lamp. The monochromator light path is placed between two closely spaced parallel mirrors (spaced apart on the order of ⅛ of an inch). The apparatus includes a circular entrance aperture having a right angle deflecting cone directed to a slit. That slit thereafter emits light to a cylindrical mirror. At the cylindrical mirror, collimated light rebounds to and on a diffraction grating. The light is chromatically classified at the diffraction grating, rebounds to the cylindrical mirror and on reflection passes to a focussing plane. At the focussing plane the particular spectra detected is displayed. Two apparatus are disclosed for tuning the spectral response of the light meter to the spectral response of the photo resist. In one embodiment moveable shutter elements at preselected intervals on either side of the focussing plane in an alternating pattern are located. By placing a photo sensor downstream of the apertures and focal plane, the flow of light through the light meter is integrated and as spectrally tailored closely parallels the response of the photo resist. According to a second and preferred embodiment, a photo diode array is placed at the focussing plane of the monochromator. The diodes are discretely tuned in their response to emulate the response of the photo resist. The output of the light meter in sum emulates the exposure characteristics of the photo resist.

8 Claims, 5 Drawing Figures

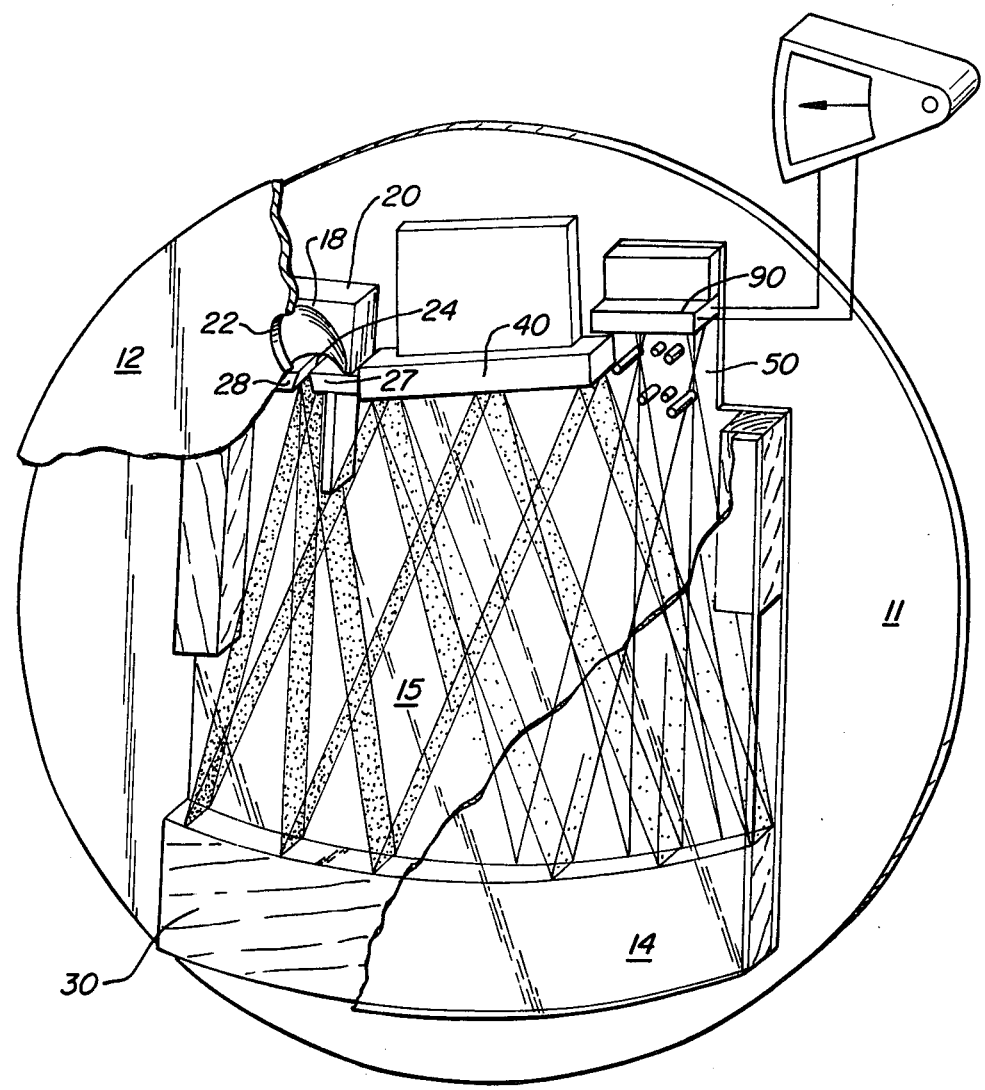
FIG._1.

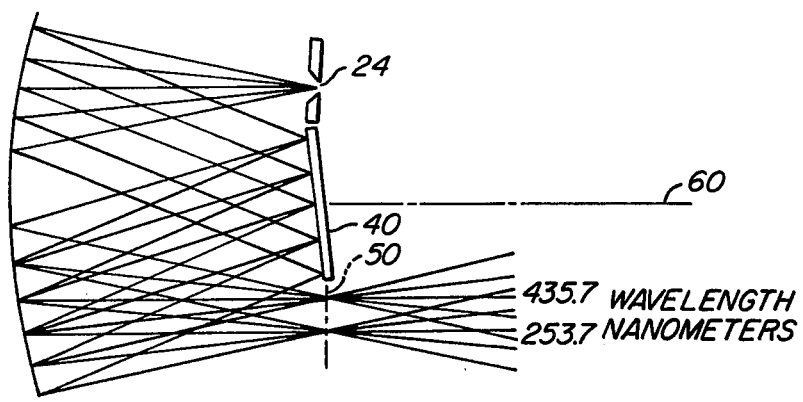
FIG._2.
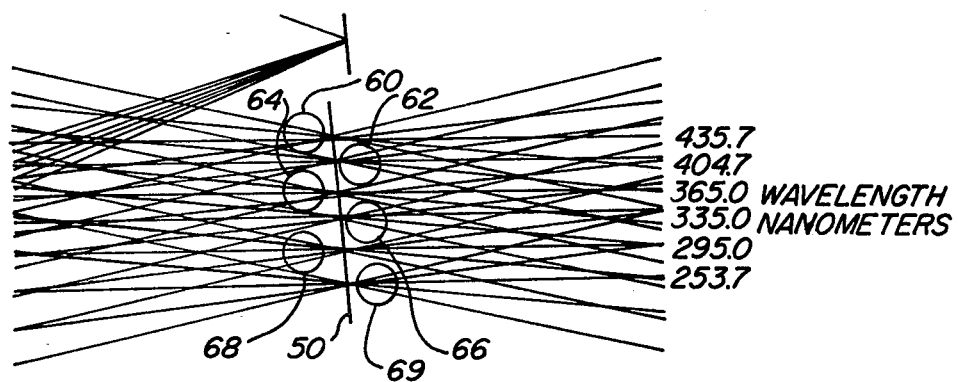
FIG._3.

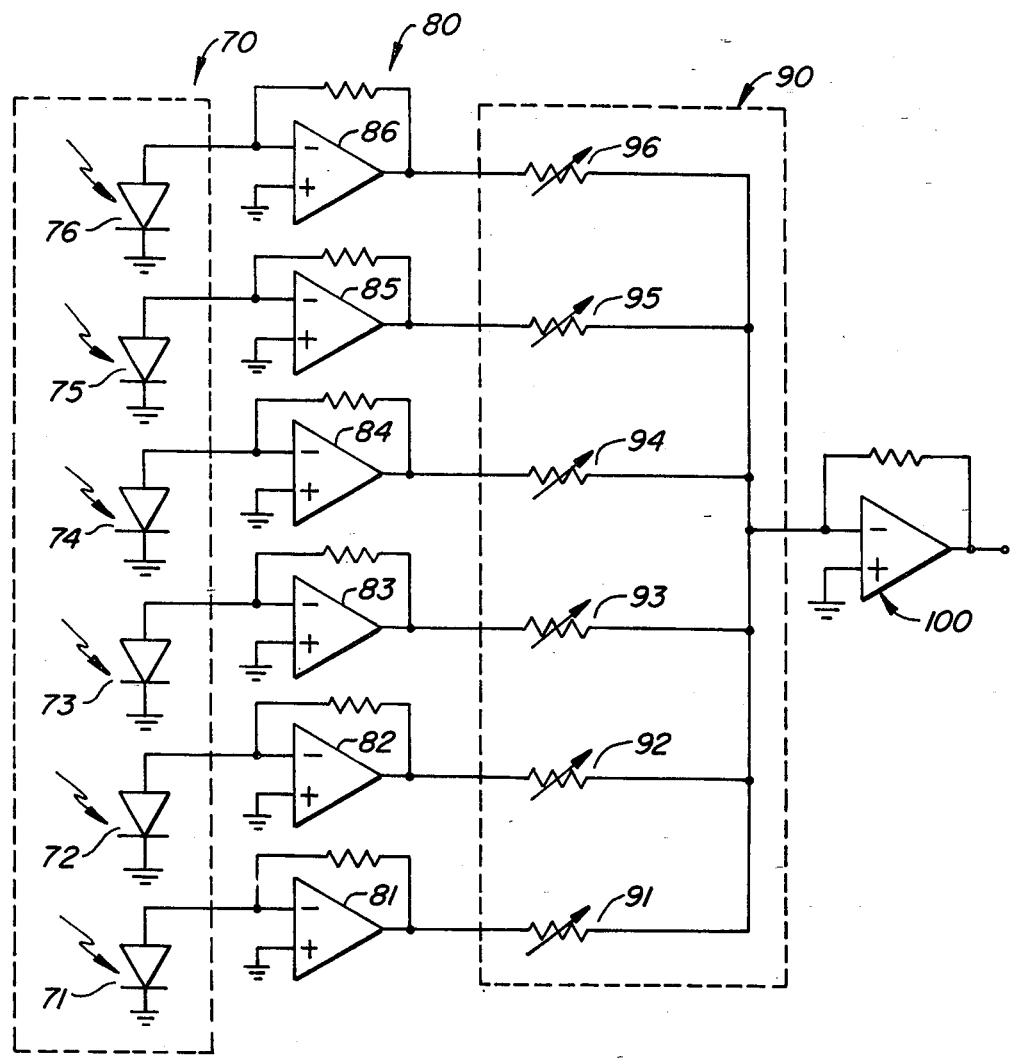
FIG._4.

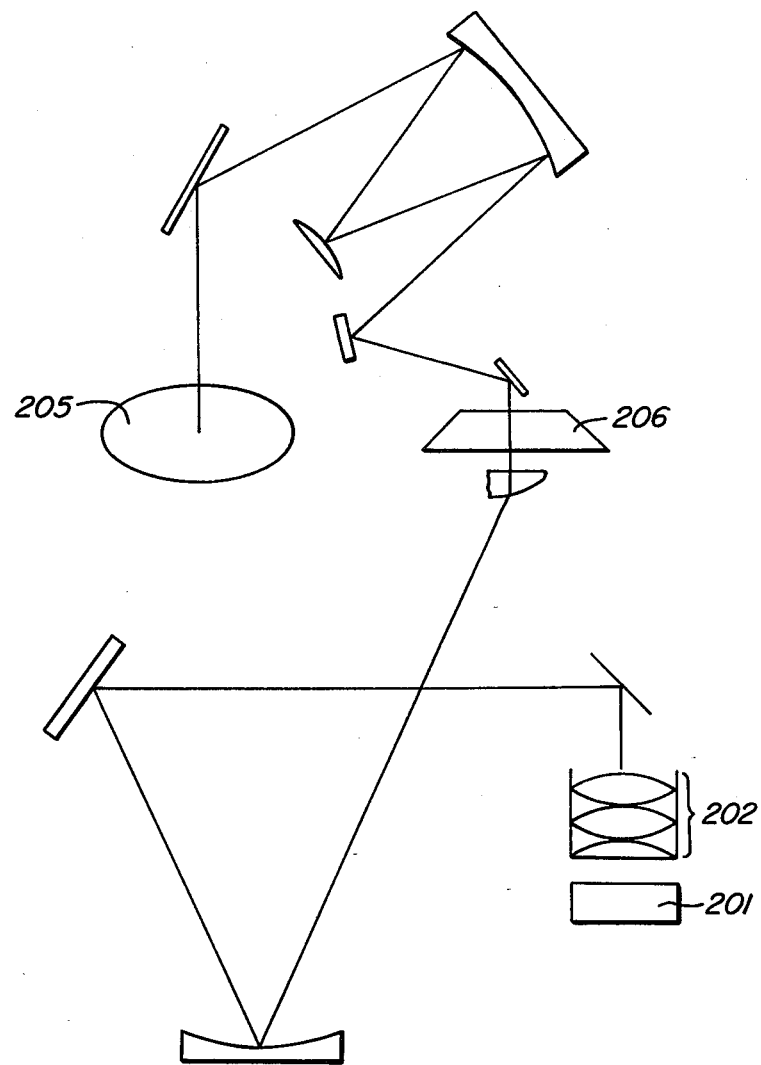
FIG._5.

SPECTRALLY TAILORED WAFER CHUCK SHAPED LIGHT METER

This invention relates to light meters and specifically to a spectrally tailored wafer chunk shaped light meter which constitutes a modification of an Ebert monochromator.

SUMMARY OF THE PROBLEM

Semi-conductor microlithography requires extremely tight control of exposure energy in order to control line widths printed on semi-conductor wafers. Present day requirements are in the vicinity of plus or minus 10% (as distinguished from regular photographic F stop variations of 100%). The requirements are getting more severe as the semi-conductor industry goes to finer lines.

The end result of any photographic exposure is a function of two components. The first component is the exposure source; in the usual projection aligner utilized for the photographic reproduction of semi-conductor chips this source comprises a mercury arc lamp. The second component is the photo resist. This photo resist is not uniform in its spectral response. Rather the photo resist varies both as the ratio of varying frequencies contained within the exposing light source as well as the overall quantum of light impinging upon the film.

Exposure sources such as high pressure mercury arc lamps are far from uniform in their performance. These lamps show large differences in spectral output (by a factor of 2 or more) from lamp to lamp. Moreover, the lamps typically change over their life time. Due to devitrification of the glass, changes in the vapor pressures interior of the lamp and other variations, dynamic variations from day to day in the same lamp as well as variations at the same time from lamp to lamp occur. Typically, the wave lengths of the spectral maxima are constant. However, the aging factors described vary the relative brightness of the maxima one to another.

I have recognized that in order to get accurate exposure readings from a light meter in the presence of spectral intensity variations of the light source, it is necessary for the meter sensor to have the same spectral response as the photo resist. Presently available meters attempt to accomplish this by using filters in front of the photo cell. Unfortunately the available filter curves provide only a crude approximation of the photo resist spectral response. For example when one of the spectral lines of the exposing source dominates and a filter sensitive to that frequency spectra is used, a spectral light meter utilizing the filter will read a light level sufficient for an exposure over a given period of time. In actual fact and due to dynamic variations of other spikes in the exposure source light curve, the total light incident upon the photo resist over a period of time may be well below or well above the desired exposure level.

In my own experience, I have seen semi-conductor manufacturers complain that when two machines are adjusted to give the same reading on a light meter having a filter placed in front of a photo cell, they produce different exposures on the photo resist. Consequently, it is now common in the art to spend significant time exposing and checking test wafers to set the exposure because of the inaccuracies of light meters.

Exposure errors result in line terminators on the chips being moved. Where the line terminators are moved, values on the chip change by appreciable amounts.

By way of example, on a high density integrated circuit chip, line terminators are used to set resistance and capacitance values. Where a line becomes overly broad, resistance can be decreased or capacitance increased. Alternately where lines become narrow, resistances may rise and capacitances may fall. Furthermore line movements can and do occur which result in shorting of an entire circuit on a chip.

The reader will recognize that often times the recognition of a particular problem can constitute invention. In this invention, I here recognize, that the need is to produce for the industry a light meter which can be chromatically tuned in order to match the frequency response of the photo resist. Consequently, it will be understood that my recognizing this need for spectral classification constitutes part of the invention herein.

SUMMARY OF THE INVENTION

An Ebert monochromator is modified in a wafer chuck format and adapted to receive and sum spectrally tailored light in discrete band widths so that the meter emulates the photographic response of photo resist to light from a high pressure mercury lamp. The monochromator light path is placed between the two closely spaced parallel mirros (spaced apart on the order of $\frac{1}{8}$ of an inch). The monochromator includes a circular entrance aperture having a right angle deflecting cone directed to a slit. That slit thereafter emits light to a cylindrical mirror. At the cylindrical mirror, collimated light rebounds to and on a diffraction grating. The light is chromatically classified at the diffraction grating, rebounds to the cylindrical mirror and on reflection passes to a focussing plane. At the focussing plane the particular spectra detected is displayed. Two apparatus are disclosed for tuning the spectal response of the light meter to the spectral response of the photo resist. In one embodiment moveable shutter elements are located at preselected intervals on either side of the focussing plane in an alternating pattern. These moveable shutter elements penetrate into and out of the interstitial area between the parallel mirrors. These moveable shutters—typically in the form of screws—allow light at discrete line widths to be tailored in passage through the light meter. By placing a photo sensor downstream of the apertures and focal plane, the flow of light through the light meter is integrated and as spectrally tailored closely parallels the response of the photo resist. According to a second and preferred embodiment, a photo diode array is placed at the focussing plane of the monochromator. The diodes are discretely tuned in their response to emulate the response of the photo resist. The output of the light meter in sum emulates the exposure characteristics of the photo resist. Both embodiments of the disclosed light meter are particularly suited to placement in the printing optics of the semi-conductor industries, such as the placement in and to alignment projectors for the making of semi-conductor chips.

OTHER OBJECTS, FEATURES AND ADVANTAGES OF INVENTION

An object of this invention is to disclose the use of an Ebert monochromator utilized essentially in a light meter configuration. According to this aspect of the invention, an Ebert monochromator light path is used. Typically the monochromator is constructed between spaced apart parallel mirrors, which mirrors are disposed normally to the light path between the exposure source and preferably in the exposure plane. Typically the light meter is placed at the plane of exposure. Light entrance occurs at a conical entrance aperture having its base opening to the exposure source. Light is passed from the conical aperture through a slit on the axis of the cone to a cylindrical mirror. At the cylindrical mirror, the light rebounds in collimation to a diffraction grating. The diffraction grating causes the light to be reflected and chromatically classified in angle of reflection. The light is reflected to the cylindrical mirror and then focussed. Each spectral band of light appears at a detector plane. At the detector plane, either mechanical or electrical means hereinafter disclosed are utilized for tailoring the response of the light meter to spectral response of photo resist.

An advantage of the disclosed light meter is that optical path for the discrete light frequencies to be measured all fit within the dimension of a wafer chuck. Accordingly, the light meter herein disclosed may be easily inserted into a projection aligner, such as that used for multiple chip exposure in the semi-conductor industry.

A further advantage of my placing the modified monochromator light meter herein disclosed between parallel mirrors is not only the small dimension but additionally the fact the light efficiency is preserved by the "barber shop" mirror effect of the parallel mirrors. With the Ebert type monochromator I disclose, light classification occurs within the focussing plane. By placing mirrors on either side of the focussing plane, I have found that the chromatic classification is preserved while the efficiency of light transmission from the entrance slit to the detector remains high. Simply stated, the required space for the light meter does not cause the efficiency of light transmission to be lost.

A further object of this invention is to disclose a mechanical means for tailoring the spectral response of the light meter I disclose. According to this object of the invention, a photo sensitive surface is placed well behind the focussing plane of the Ebert monochromator. The exit ing slit is omitted in the entirety. Instead and at preselected intervals on opposite sides of the focal plane of the Ebert monochromator, posts of adjustable height are placed. These posts—preferably consisting of common screws—are movable into and out of the passing color classified beams of light. By such movement they in effect tailor the amount of light at discrete position selected frequencies reaching the downstream photo sensitive surfaces. Movements of the given posts can interfere with given nanometric wave lengths. By the spatial placement of the posts, adjustments in the sensitivity of the light meter can result. A light meter which can be spectrally tailored in its reception is produced.

Yet another object of this invention is to disclose an array of such posts which operates on discrete frequency ranges. According to this aspect of the invention the posts are placed at alternating intervals in front of and behind the focal plane. Placement is made so that for the frequency desired to be specifically contoured, the particular posts intercept all rays proceeding to or from the focal plane.

An advantage of this array of focussing elements offset from the focal plane is that discrete frequencies can be specifically tuned. Moreover, frequencies bracketing or in between the tuned frequencies will be averaged in their contours. Consequently, the resultant meter discloses an averaging response between the discrete settings.

Yet another advantage of this array of posts out of the focal plane is that the criticality of the array of adjustable shutter elements each mechanically interlocking one with another is avoided.

Yet another advantage of the disclosed mechanical array is that a technician in adjusting the spectral selectivity of the meter readily knows the wave lengths affected by adjustment. The outward mechanical appearance of the meter has mechanical adjustment for each frequency at differing locations. By the simple expedient of placing the screws for various frequencies on opposite sides of the focal plane, the outward geographic position of the screw on the light meter is indicative of the particular frequency being tuned.

Yet another object of this invention is to disclose an electrical means of tailoring the response of my light meter. According to this aspect of the invention, a photo sensitive array is placed in or near the plane of focus of the modified monochromator. The monochromator then displays its output through disclosed summing circuitry. Typically the photo diodes of the display are discretely weighted to emulate the response of photo resist. A sum results which can closely approximate the exposure sums of photo resist.

An advantage of this aspect of the invention is that mechanical adjustments are avoided. Instead and by discrete tuning of the output of each of the diodes in the diode array, spectral selectivity of the sum output of the light meter is easily obtained.

A further advantage of this aspect of my invention is that the summing of the spectral output is easily altered. For example, summing can occur through conventional micro-processor readouts and be weighted by readily alterable programs. By having discrete program alterations for discrete photo resist compositions, a light meter can be rapidly tailored in its spectral response for varying photo resists.

Other objects features and advantages of this invention will become more apparent after referring to the following specification and attached drawings in which:

FIG. 1 is a perspective view of the light meter of my invention;

FIG. 2 is a representation of computer generated graphics illustrating the spectral display of the light meter of my invention;

FIG. 3 is an expanded view of the graphics of FIG. 2 illustrating the mechanical shutter embodiment of my invention;

FIG. 4 gives a circuit schematic showing representative circuitry for receiving and tuning the spectral response of the disclosed light meter; and, FIG. 5 is an illustration of the typical projection aligner having the light meter of this invention inserted therein.

Referring to FIG. 1 the light meter of my invention is illustrated sandwiched between covers 11, 12. The optical portions of the light meter are themselves sandwiched between two mirrors 14, 15. The cover and mirrors define an aperture 22 and have communicated thereto a conical reflecting chamber 18 defined within a body 20 of relatively high reflectivity. It can be seen that the function of the cone 18 and slit 24 is to deflect incoming light at right angles into slit 24.

Communicated to one side of chamber 18 is a slit 24. Slit 24 emits diverging light rays to a cylindrical mirror 30. Light from slit 24 upon impacting mirror 30 and reflected therefrom rebounds in collimation to diffraction grating 40.

At the diffraction grating, dependent upon both the tipping of the grating as well as the spatial separation of the rulings, chromatic classification occurs with reflection to the cylindrical mirror 30. Mirror 30 in turn causes focus of the discrete spectral bands at the focal plane 50. The discrete frequencies come to focus at discrete lines. Thereafter, light impinges upon a photo sensitive surface 90 and is read by conventional meters. In the embodiment illustrated in FIG. 1, the photo sensitive surface 90 in effect integrates the total light received. It is directly connected to an output meter to give the light intensity reading desired.

Referring to the computer generated graphics of FIG. 2, specifics can be given of a typical light meter. Specifically, the cylindrical mirror is at least 2.5 inches in length. It is designed to have a 4 inch radius of curvature.

An axis generated at the sagitta of the 2.5 inch segment of the mirror is convenient for the description. An entrance slit 24 is ¾ inch off of this axis and aligned parallel thereto.

Diffraction grating 40 includes six hundred rulings per millimeter. Typically, the grating is tipped at an angle of 5.71 degrees in the direction of entrance slit 24.

The 4 inch radius of curvature mirror in effect produces a focal plane 50. The discrete frequencies specifically attenuated in the spectral tuning of the light meters can be illustrated with respect to FIG. 3.

In the ultra violet range common in the semi-conductor industry, discrete nanometric bands are of interest as typically coincident to peaks or spikes in the spectral output of mercury (Hg) high pressure lamps. Specifically, the following nanometric ranges are of specific interest: 253.7; 295.0; 335.0; 365.0; 404.7; 435.7 all of the above to plus or minus 2 nanometers.

The reader will understand that the modification here of the Eber monochromator is to fabricate Eber type optics to a spectrograph. Unlike a spectrograph, weight summing of the discrete spectral bands must occur. A mechanical scheme for producing such weighted summing is shown in FIG. 3.

Referring to FIG. 3, the placement of the mechanical aperture stops of this invention is illustrated. Specifically, they take the form of threaded screws passing from the back surface of mirror 15 and intruding into the interstitial area between the confronting reflective surfaces on mirror pieces 14, 15.

In the following description, the "near side" location of the mechanical stops will be referred to as that side to and towards the cylindrical mirror from focal plane 50. The "far side" will be referred to as that side of focal plane 50 which is away from the cylindrical mirror.

A first shutter stop 60 is disclosed on the near side of focal plane 50. Typically, it comprises a threaded bolt of a preselected diameter, the diameter being directly dependent upon its spacing from the focal plane 50. Typically it is placed on the near side of the focal plane 50 so that all converging rays of the 435.7 nanometer band are obscured. Thus upon adjustment of the screw into and out of the plane of mirror 15 interference with the 435.7 nanometer band will occur.

Likewise and on the far side of plane 50 there is placed a second shutter stop 62. Shutter stop 62 interferes with all diverging rays of the 404.7 nanometer band.

Similar aperture stops 64 for 365.0 nanometers, 66 for 335.0 nanometers, 68 for 295.0 nanometers and 69 for 253.7 nanometers are utilized. In each case they are placed on alternating sides far and near of the focal plane 50 to interfere physically with either the converging or diverging rays.

It is important to note that the disclosed filter elements do not overlap or interfere one with another mechanically. This is accomplished by the disclosed spacing out of the focal plane 50. Moreover, and as light passes through to the photo diode 90, an integration of the total light passed at each of the band widths will occur. This integration will emulate the exposure properties of the photo resist to which the light meter is tuned.

The reader will realize that the mechanical shuttering scheme herein illustrated with respect to FIGS. 1–3 can be substituted with electronic shuttering schemes. Like the previous scheme, a system of weighted averaging is utilized to give the desired output.

Referring to FIG. 4, a photo diode array 70 is illustrated. Each of the diodes 71–76 is positioned preferably near the focal plane 50 of the light meter of FIG. 1 with the shutter stops omitted. Although the diodes 71–76 are shown here equally spaced, it should be apparent to the reader that they can be positioned especially to be impacted by the spectral bands of interest.

An array 80 of six operational amplifiers are each connected in series. The operational amplifiers 81–86 are conventionally wired each in parallel to output.

An array 90 of six variable resistors are utilized. Thus discrete resistors 91–96 control the outputs of the discrete nanometric bands in series with each of the outputs.

These respective resistors in turn are connected in parallel to an operational amplifier 100. It can be readily be seen by the discrete tuning of the individual resistors 91–96, tuning of the input to the summing amplifier 100 can occur. The output of amplifier 100 is to a meter which may be voltage or current responsive depending upon the particular configurations of the summing amplifier 100 used.

The reader will realize that instead of the variable resistors, fixed resistors of the proper values may be used and in plugged bock array 90. With the block array 90 labelled as to the discrete name of the photo resist utilized, the plug in block could be sent out with the film. This would minimize the probability of the user's setting being improper. Such a plug in block is schematically illustrated in the broken lines 90 around the discrete adjustable resistors 91–96. Likewise and in place of the analog summing circuit shown, the output of each of the six input operational amplifiers may be fed in to an analog to digital converter. The digital signals thus obtained may be multiplied by the proper constants and thereafter summed using conventional micro processor techniques.

Referring to FIG. 5, the optic schematic of a typical projection aligner is shown. Briefly, a mercury light source 201 relays light through condenser optics 202 to a relay mirror train taking a folded path to a wafer chuck 205. The optical mask is typically placed at a location 206 intermediate the light source 201 and wafer chuck 205. It is at the location of the wafer chuck 205 that light meter of this invention is disposed. Similarly, a possible location for the filter can include the mask 206.

While an Ebert monochromator is shown in this example, the invention is obviously applicable to other well known monochromator configurations.

What is claimed:

1. A light meter comprising in combination:

a modified monochromator having a light entrance slit, a cylindrical mirror, a diffraction grating and a focussing plane, each disposed between parallel and confronting mirrors; said light entrance slit disposed with respect to said cylindrical mirror to allow diverging light to pass between said slit and said cylindrical mirror and to have rebounding therefrom substantially collimated light rays; said diffraction grating disposed with respect to said cylindrical mirror and entrance slit to receive substantially collimated light rays from said cylindrical mirror and to reflect chromatically classified rays to said cylindrical mirror; said focussing plane created by and disposed with respect to said cylindrical mirror and diffraction grating, which cylindrical mirror and diffraction grating focus discrete chromatic bands at discrete locations on said plane; and means for weighted summing of the discrete chromatic bands at said foccusing plane.

2. A spectrally tailored wafer chuck shaped light meter comprising in combination:
   (a) first and second reflective mirrors disposed a preselected interval apart one from another;
   (b) light meter optics sandwiched between said mirrors including an aperture for passing light from the exterior of said light meter into the interior of said light meter;
   (c) an entrance slit for communicating from said aperture on one side and to the interstices of said mirrors on the other side;
   (d) a cylindrical mirror disposed a distance from said slit to permit the incidence of diverging rays from said slit on said cylindrical mirror and to reflect said rays in collimation;
   (e) a diffraction grating disposed with respect to said cylindrical mirror to permit reception of collimated light from said cylindrical mirror and reflection of chromatically classified light to said cylindrical mirror;
   (f) an imaging plane for imaging the light received by said light meter, said imaging plane disposed with respect to said diffraction grating at a conjugate location with respect to said cylindrical mirror whereby the spectra is broadcast in focus along a spatial array;
   (g) weighted summing means optically communicated to said broadcast spectra for discretely weighting each preselected spectral range one to another in selected ratios; and
   (h) an output for indicating the totality of said respective weighted sums.

3. The invention of claim 2 and wherein said summing means includes a photo diode array disposed proximate said imaging plane; and means discretely coupled to the output of each photo diode of said array for weighted summing of the output of said photo diode.

4. The invention of claim 3 and wherein said weighted summing means comprises a plug in module.

5. The invention of claim 2 and wherein said weighted summing means includes a group of movable shutter elements.

6. The invention of claim 5 and wherein said shutter elements are not coincident to the said imaging plane.

7. The invention of claim 6 and wherein shutter elements comprise machine screws.

8. The invention of claim 2 and wherein the reflective mirrors are parallel and confronting.

* * * * *